US010427165B2

(12) United States Patent
Pallmann

(10) Patent No.: US 10,427,165 B2
(45) Date of Patent: Oct. 1, 2019

(54) METHOD FOR COMMINUTING HEAT-SENSITIVE FEEDSTOCK

(71) Applicant: PALLMANN MASCHINENFABRIK GmbH & Co. KG, Zweibruecken (DE)

(72) Inventor: Hartmut Pallmann, Zweibruecken (DE)

(73) Assignee: PALLMANN MASCHINENFABRIK GmbH & Co., KG, Zweibruecken (DE)

( * ) Notice: Subject to any disclaimer, the term of this patent is extended or adjusted under 35 U.S.C. 154(b) by 723 days.

(21) Appl. No.: 15/071,722

(22) Filed: Mar. 16, 2016

(65) Prior Publication Data

US 2016/0271619 A1 Sep. 22, 2016

(30) Foreign Application Priority Data

Mar. 16, 2015 (DE) .......................... 10 2015 003 260

(51) Int. Cl.
*B02C 23/38* (2006.01)
*B02C 23/18* (2006.01)
(Continued)

(52) U.S. Cl.
CPC ............ *B02C 23/38* (2013.01); *B02C 18/148* (2013.01); *B02C 23/14* (2013.01); *B02C 23/18* (2013.01); *B02C 23/24* (2013.01); *B02C 23/40* (2013.01); *B02C 25/00* (2013.01); *B29B 17/0404* (2013.01); *B02C 2013/145* (2013.01); *B02C 2201/04* (2013.01); *B29B 2017/0416* (2013.01);
(Continued)

(58) Field of Classification Search
CPC .................................................. B02C 2201/04
USPC ............................................. 241/23, 65, 29
See application file for complete search history.

(56) References Cited

U.S. PATENT DOCUMENTS 3,071,330 A * 1/1963 Jackering ................ B02C 13/14
241/53
3,268,179 A * 8/1966 Glynn ..................... B02C 13/14
241/19
(Continued)

FOREIGN PATENT DOCUMENTS

DE 37 08 914 A1 10/1987
DE 197 15 772 C1 7/1998

*Primary Examiner* — Shelley M Self
*Assistant Examiner* — Bobby Yeonjin Kim
(74) *Attorney, Agent, or Firm* — Muncy, Geissler, Olds & Lowe, P.C.

(57) ABSTRACT

A method for comminuting heat-sensitive feedstock, particularly thermoplastics, rubber, caoutchouc, and elastomers, to a particle size of less than 500 μm, preferably less than 425 μm. Process steps are provided to achieve an economic material processing without the use of cryogenic comminution. First, a precomminution of the feedstock to a size smaller than 4 mm is performed in a rotating comminuting device through which a first process gas $PG_1$ flows. Then, a fine grinding is performed of the precomminuted feedstock to a size smaller than 500 μm, preferably smaller than 425 μm, in a rotating fine grinding device through which a second process gas $PG_2$ flows. Whereby the temperature of the precomminuted feedstock in the outlet of the fine grinding is regulated in a second control circuit by adding water to the precomminuted feedstock before and/or during and/or after the fine grinding.

18 Claims, 1 Drawing Sheet

(51) Int. Cl.
  *B02C 23/14* (2006.01)
  *B02C 18/14* (2006.01)
  *B02C 23/24* (2006.01)
  *B02C 23/40* (2006.01)
  *B02C 25/00* (2006.01)
  *B29B 17/04* (2006.01)
  *B02C 13/14* (2006.01)
  *B29K 7/00* (2006.01)
  *B29K 21/00* (2006.01)
  *B29K 101/12* (2006.01)

(52) U.S. Cl.
  CPC ... *B29B 2017/0484* (2013.01); *B29K 2007/00* (2013.01); *B29K 2021/00* (2013.01); *B29K 2101/12* (2013.01); *Y02W 30/625* (2015.05)

(56) References Cited

U.S. PATENT DOCUMENTS

| | | | | |
|---|---|---|---|---|
| 3,771,729 A * | 11/1973 | Frable | B02C 19/186 | 241/23 |
| 3,966,125 A * | 6/1976 | Finkbeiner | B29B 17/02 | 241/14 |
| 4,025,990 A * | 5/1977 | Lovette, Jr. | B02C 19/186 | 241/14 |
| 4,113,186 A * | 9/1978 | Smith | B29B 17/02 | 241/24.14 |
| 4,372,751 A * | 2/1983 | Chapman | C10L 1/322 | 241/101.5 |
| 4,427,157 A * | 1/1984 | Klein | B01D 39/04 | 100/118 |
| 4,607,796 A * | 8/1986 | Enikolopov | B29B 17/0404 | 241/23 |
| 4,625,922 A * | 12/1986 | Brubaker | B02C 7/02 | 241/17 |
| 4,650,126 A * | 3/1987 | Feder | B29B 13/10 | 241/22 |
| 5,174,512 A * | 12/1992 | Orlandi | B02C 17/06 | 241/153 |
| 5,513,809 A * | 5/1996 | Perkel | B02C 17/14 | 241/175 |
| 5,588,600 A * | 12/1996 | Perfido | B29B 17/02 | 241/152.1 |
| 5,666,878 A * | 9/1997 | Taricco | A61L 2/07 | 100/250 |
| 5,735,471 A * | 4/1998 | Muro | B02C 1/04 | 241/23 |
| 5,927,620 A * | 7/1999 | Memon | B29B 17/02 | 241/17 |
| 6,527,206 B1 * | 3/2003 | Wuebbels | B03B 9/061 | 241/152.2 |
| 6,648,253 B1 * | 11/2003 | Adolph | B02C 13/282 | 241/189.1 |
| 7,445,170 B2 * | 11/2008 | Cialone | B29B 17/02 | 241/24.17 |
| 7,654,477 B2 * | 2/2010 | Tirelli | B29B 13/10 | 241/16 |
| 7,757,974 B2 * | 7/2010 | Hofmann | B29B 17/02 | 241/20 |
| 8,573,520 B2 * | 11/2013 | Goedert | B02C 23/30 | 241/18 |
| 2011/0251368 A1 * | 10/2011 | Hackl | B29B 13/10 | 526/352 |
| 2011/0288188 A1 * | 11/2011 | Walters | B29B 17/02 | 521/40 |
| 2013/0270374 A1 * | 10/2013 | Ceru | E03C 1/2665 | 241/25 |
| 2017/0043351 A1 * | 2/2017 | Stravinski | B02C 23/10 | |

* cited by examiner

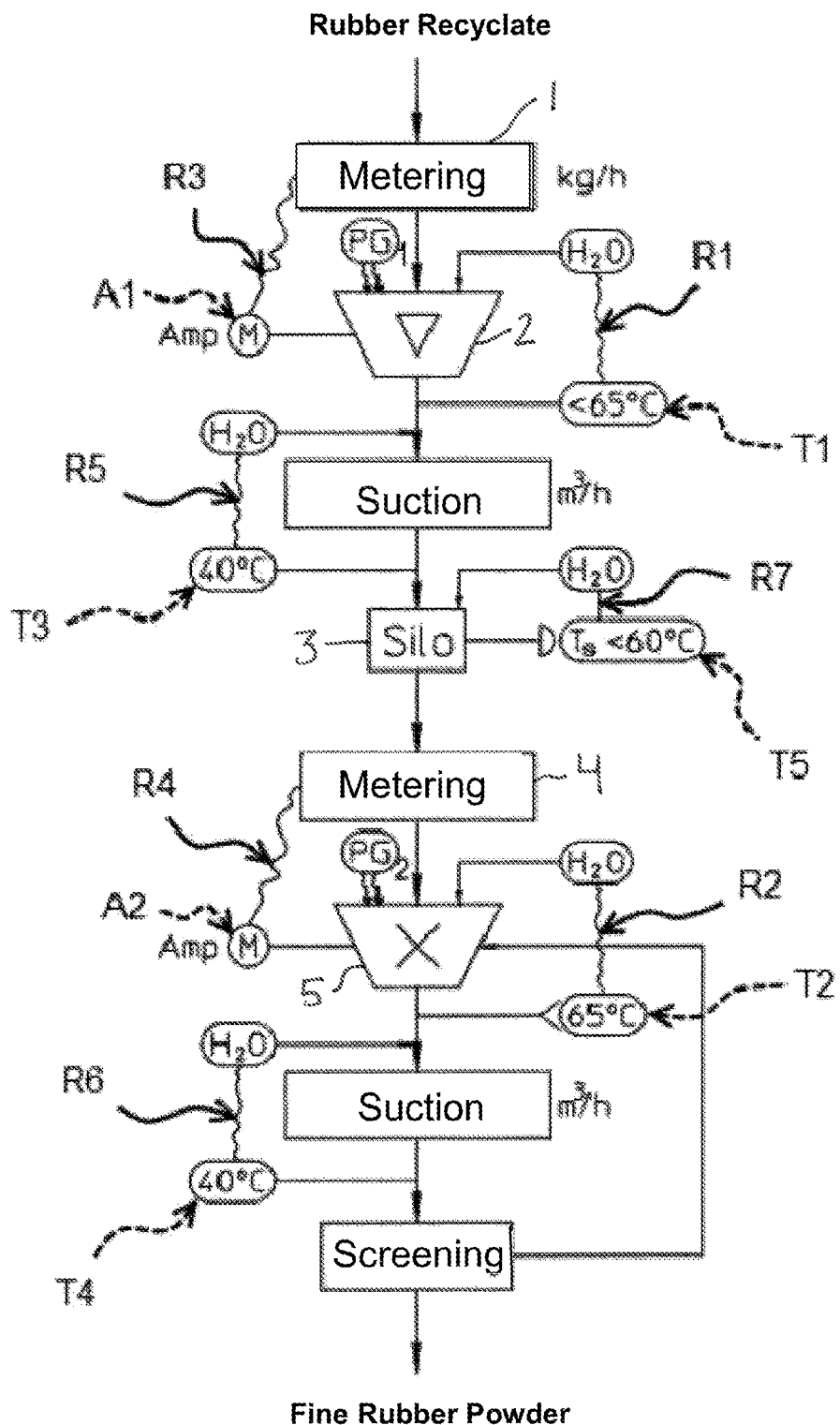

METHOD FOR COMMINUTING HEAT-SENSITIVE FEEDSTOCK

This nonprovisional application claims priority under 35 U.S.C. § 119(a) to German Patent Application No. 10 2015 003 260.7, which was filed in Germany on Mar. 16, 2015, and which is herein incorporated by reference.

BACKGROUND OF THE INVENTION

Field of the Invention

The invention relates to a method for comminuting heat-sensitive feedstock, particularly for the fine grinding of thermoplastics, rubber, caoutchouc, and elastomers to a particle size less than 500 µm, preferably less than 425 µm.

Description of the Background Art

During the comminution of feedstock, a substantial part of the energy to be applied for the comminution is converted to heat. This is caused by cutting, frictional, and impact forces to which the feedstock is subjected during the comminution. In the comminution of heat-sensitive feedstock, to prevent thermal damage it is therefore necessary to cool the feedstock and/or to reduce the heat input by decreasing the production output.

In comminuting devices through which air flows, the feedstock is cooled by the airflow necessary for transporting of the feedstock within the device. This so-called self-generated air can be produced by the device itself and optionally can be supported by a suction fan. If the material is not heat-sensitive, the self-generated air flow inherent in conventional devices is sufficient to cool down the comminuting tools so greatly that any adverse effects on the feedstock are eliminated.

Problems occur on a regular basis when heat-sensitive feedstock is to be comminuted. Especially when materials with a low softening point such as, for example, thermoplastics, are to be comminuted, the operators of conventional devices face a difficult task. In order to achieve the highest possible machine output, grinding of the feedstock is to occur at the maximum possible temperature. If in so doing the material-dependent temperature limit is exceeded, the feedstock softens and begins to melt with the result that individual particles agglomerate and thereby the particle size and particle distribution of the comminuted material are no longer within the desired range. Or a thermal decomposition of the feedstock occurs, whereby the particles heated above the temperature limit bake onto the machine parts and particularly onto the comminuting tools, so that both the machine output and the quality of the end product suffer as a result.

Reducing the output of comminuting devices is a known approach to prevent thermal damage to the feedstock during the comminution thereof. In this way, less comminuting work is done per unit time, thus producing less excess heat. It must be accepted in this regard, however, that the comminuting device is not operated at full capacity, which is contrary to the fundamental requirement of an economic operation of such devices.

This problem is compounded in fine grinding, because it was found that the finer the end product is to be, the more comminuting work has to be done and the greater the heat input into the feedstock.

Increasing the cooling effect by increasing the amount of the self-generated air of a conventional comminuting device, in order to be able to remove the additional heat, is possible only within narrow limits, because the amount of the self-generated air determines the flow velocity and thereby the residence time of the grinding stock in the grinding zone and thereby also the fineness of the end product.

During the fine grinding of certain materials such as, for example, rubber, caoutchouc, and elastomers, there is, moreover, the problem that grinding of the feedstock is not readily possible because of its elastic properties. For this reason, in these cases the transition has already been made to cool the feedstock to temperatures far below the freezing point by adding a coolant. The associated embrittlement of the feedstock then allows comminution of the embrittled particles by means of breaking (cryogenic comminution). Because the cooling of the feedstock to the necessary low temperatures requires considerable amounts of coolant, this type of comminution is very cost-intensive. Moreover, cryogenic comminution produces an end product whose particles are characterized by a cubic shape with a relatively smooth surface. These material properties are disadvantageous, however, for some uses of the end product, particularly if forming a connection with other materials as intimate as possible is a required ability.

DE 197 15 772 C1 discloses a method and a device for preparing plastic waste products. The waste products are first subjected to a precomminution in a shredder and the raw grinding stock obtained thereby is stored temporarily in a storage tank. The raw grinding stock is then fed into an impact mill for further comminution. The substances present in the grinding stock are separated at subsequent stations and supplied as a secondary raw material for recycling. It has also been recognized here that frictional heat is formed due to the grinding process in the impact mill; such heat is in fact desirable for drying the grinding stock but nevertheless should not be too hot. In order to keep the temperature of the grinding air in a range between 70° C. and 92° C., it is proposed to supply water to the grinding air in the feed to the impact mill.

Further, DE 37 08 914 A1 discloses an impact mill for comminuting grinding stock with a rotor, equipped with impact tools and disposed within a housing. The grinding stock is supplied to the rotor via a supply opening and after it is comminuted, it is fed into a separating device. The metered addition of grinding stock to the impact mill occurs depending on the power consumption of the drive for the rotor by scaling back the feed when the drive's current consumption is too high.

SUMMARY OF THE INVENTION

It is therefore an object of the invention to provide an option for comminuting heat-sensitive feedstock to a diameter of at most 500 µm, preferably at most 425 µm, without having to cool the feedstock below the freezing point.

In an embodiment, a method is provided based on cryogenic comminution of feedstock, because hitherto experts have held the unanimous view that comminution of particles to a diameter less than 500 µm, preferably less than 425 µm, is not possible in some other way. It is the merit of the invention to have departed from this idea and to have developed a method that allows fine grinding of heat-sensitive materials at temperatures far above 0° C. A cryogenic comminution and thereby the cost-intensive use of special coolants such as, for example, liquid nitrogen are unnecessary as a result, which entails a substantial economic advantage.

A further advantage over a cryogenic comminution is based on the different mode of action of the inventive type of comminution. Whereas in the cryogenic comminution by embrittlement of the feedstock, breaking of the material particles is achieved under the effect of impact energy, the material particles in the method of the invention are comminuted substantially by tearing. The result is an irregular form of the comminuted material particles with a rough surface, which during further use of these particles enormously improves the bonding properties thereof with other materials.

According to an embodiment of the invention, continuous cooling of the feedstock occurs in each case via the constant product gas stream $PG_1$ or $PG_2$, which is quantitatively dependent on the self-generated air of the comminuting device or fine grinding device and is usually obtained from the ambient air. On the one hand, however, its cooling capacity is not sufficient to cool heat-sensitive feedstock sufficiently; on the other, its cooling capacity varies depending on air humidity and air temperature. For this reason, the solution of the invention in each case provides for a dynamic supplementation of the cooling performance by the selective addition of a coolant to the comminution or fine grinding process with the simultaneous monitoring of the temperature before and/or during and/or after the precomminution or fine grinding. For example, water can be used as the cooling medium, which is supplied to the material stream as a mist, spray mist, or stream.

If these two measures for temperature regulation still would not be sufficient, thus it is provided according to an embodiment of the invention to slow down the machine output of the precomminution and/or fine grinding. For this purpose, the maximum energy consumption of the comminuting device or fine grinding device is reduced, which is used as a reference variable in a control circuit for determining the amount of the feedstock to be metered. The amount of the supplied feedstock is reduced in this way and heat development is thus counteracted.

Suction is provided according to an exemplary embodiment to remove the feedstock from the precomminution and/or fine grinding. The suction is produced substantially by suction lines which are supplied with a low pressure and connect to the material outlet of the particular machine and in which the feedstock is transported away. In this process, water can be supplied additionally to the material stream, with the advantage that an unwanted rise in temperature is prevented. It can be achieved at the same time that the particles are coated with a water film, which counteracts the tendency of material particles to agglomerate. It turned out that this entails enormous advantages in transport, storage, screening, and bagging of the feedstock or the end product.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE illustrates a flowchart according to an exemplary embodiment of the invention.

DETAILED DESCRIPTION

The course of the method of the invention emerges from the flowchart shown in the FIGURE. The starting material for the method of the invention in the present exemplary embodiment is rubber waste, for example, peeled rubber as it accumulates during used tire processing, with pieces about 10 mm to 20 mm in size. This feedstock is supplied to a rotating comminution device 2 for precomminution via a metering station 1, where the feedstock is precomminuted to a particle size of at most 4 mm, preferably at most 2 mm. The precomminution occurs in a knife mill or cutting mill whose electrically driven rotor is equipped with blades. The rotor is surrounded by a screen basket, which keeps the feedstock within the active zone of the blades until comminution to below the hole diameter of the screen has occurred. After sufficient comminution of the feedstock, the material particles in process gas stream PG1 are removed from the precomminution. During the comminution, only part of the driving power is used for material comminution; the remaining part is converted to heat energy, which is the cause of the rise in the feedstock temperature.

According to the invention, in this case thermal damage of the feedstock is prevented by the combined cooling measures. A portion of the excess heat energy is removed by the constant-volume process gas stream $PG_1$, whose primary task is to provide for the transport of the feedstock to and from the comminution zone. The temperature $T_1$ of the feedstock at the exit from the precomminution is monitored via a temperature sensor disposed downstream of the precomminution.

If the cooling effect of the self-generated air at the given load of the comminuting device is not sufficient, which can be determined by a rise in the temperature $T_1$, water, which removes heat from the feedstock by evaporation, is then added as a coolant to the material stream before and/or during the precomminution. The amount of coolant is regulated via a first control circuit $R_1$ so that the temperature $T_1$ remains below a predefined setpoint, for example, below 70° C., preferably below 65° C., most preferably below 55° C. The material stream in the outlet from the precomminution in this case has an inherent moisture content of about 3% to 5%.

If these measures are not sufficient to maintain the temperature $T_1$, then the metering of the comminuting device is regulated in a control circuit $R_3$ as a function of the electrical current consumption. Reducing the setpoint for the maximum current consumption $A_1$ of the comminuting device results in a limitation of the feedstock amount supplied to the precomminution and thereby also in a limitation of the heat development.

The precomminuted feedstock is removed via suction from the comminution device 2 and is supplied to a silo 3 for temporary storage. In terms of plant layout, the suction is connected to the material outlet of the comminuting device 2. Water is again supplied in the suction area to reduce the feedstock temperature further to a value T3. The amount of supplied water is determined in a control circuit R5, in which the present material temperature in the suction area is compared with the temperature T3 and if there is a deviation a control signal is output. The temperature of the precomminuted feedstock before its intermediate storage is at most 45° C., preferably at most 40° C., and is preferably between 20° C. and 35° C. The inherent moisture content is 10% to 15%.

As a safety measure to prevent a smoldering fire, it is possible to add water again during the intermediate storage of the precomminuted feedstock in the silo 3 or to flood the silo 3. To this end, the temperature of the precomminuted feedstock is monitored in a control circuit R7 and water is supplied if a limit value T5 is exceeded. The limit value T5 is, for example, at most 75° C., preferably at most 60° C.

The precomminuted feedstock is supplied from the silo 3 to fine grinding in a rotating find grinding device 5 by means of a second metering station 4. The feedstock in this case has a temperature of about 20° C. to 30° C. at an inherent moisture content of 5% to 10%.

The subsequent fine grinding can occur, for example, in a turbo mill whose rotating impact plates produce a highly turbulent vortex field in which the material particles are exposed to high acceleration and impact forces bringing about the comminution. Here as well, the self-generated air of the mill, which flows through the comminution chamber as a constant-volume process gas stream $PG_2$, contributes a first portion for cooling the feedstock.

If the material temperature exceeds a limit value $T_2$, which is monitored downstream of the grinding zone at the exit from the fine grinding, then water is supplied as a coolant to the feedstock before the fine grinding, for example, in the feed to the mill, and/or during the fine grinding, for example, in the grinding zone of the mill, and/or after the fine grinding, for example, in the outlet from the mill, in a control circuit $R_2$ until the temperature $T_2$ is reached. The temperature $T_2$ is, for example, at most 70° C., preferably at most 65° C., most preferably at most 55° C.

If this measure is not sufficient, thus slowing down the metering can further affect the temperature development. To this end, the maximum current consumption $A_2$ of the mill is limited and monitored in a control circuit $R_4$, as has already been described during the precomminution.

After the fine grinding, a predominant portion of about 90% to 99% of the end product has a particle size of at most 500 μm, preferably at most 425 μm, at a temperature below $T_2$ and an inherent moisture content preferably in the range of 0.5% to 2%.

The removal of the sufficiently refined material from the fine grinding occurs again actively via suction, which in terms of plant layout is connected to the material outlet of the fine grinding device. Water is again supplied in the suction area to reduce the material temperature to a value $T_4$. The amount of supplied water is determined in a control circuit $R_6$, in which the present material temperature in the suction area is compared with the temperature $T_4$ and if there is a deviation a control signal is output. The temperature $T_4$, which in the present exemplary embodiment is at most 45° C., preferably at most 40° C., for example, between 20° C. and 35° C., is therefore used as a reference variable for control circuit $R_6$. Optionally, an inherent moisture content of at most 1% is achieved by secondary drying of the material in the suction air stream.

In the subsequent process step, the material leaving the mill is screened, whereby particles larger than 500 μm, preferably larger than 425 μm, are returned to the fine grinding and the sufficiently refined end product is packaged.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for comminuting heat-sensitive feedstock to a particle size of less than 500 μm, the method comprising:
   precomminuting the feedstock to a size smaller than 4 mm in a rotating comminuting device through which a first process gas stream flows;
   regulating a first temperature of the feedstock in an outlet of the rotating comminuting device in a first control circuit by adding water to the feedstock before and/or during and/or after the precomminution;
   after the precomminuting of the feedstock, fine grinding the feedstock to a size smaller than 500 μm in a rotating fine grinding device through which a second process gas stream flows; and
   regulating a second temperature of the feedstock in an outlet of the rotating fine grinding device in a second control circuit by adding water to the feedstock before and/or during and/or after the fine grinding,
   wherein the feedstock is removed by suction from the outlet of the rotating comminuting device, and wherein a third temperature of the feedstock in the suction area is regulated in another control circuit by adding water in the suction area and/or in the outlet of the rotating comminuting device.

2. The method according to claim 1, wherein a metering of the feedstock to the rotating comminuting device is regulated in a third control circuit as a function of the energy consumption of the rotating comminuting device.

3. The method according to claim 1, wherein a metering of the feedstock to the rotating fine grinding device is regulated in another control circuit as a function of the energy consumption of the rotating fine grinding device.

4. The method according to claim 1, wherein the feedstock is temporarily stored in an intermediate storage facility before entering the rotating fine grinding device, and wherein a temperature of the feedstock in the intermediate storage facility is monitored in another control circuit.

5. The method according to claim 4, wherein the temperature of the feedstock in the intermediate storage facility is at most 75° C.

6. The method according to claim 4, wherein the temperature of the feedstock in the intermediate storage facility is at most 60° C.

7. The method according to claim 1, wherein the first temperature and/or the second temperature are at most 70° C.

8. The method according to claim 1, wherein the third temperature is at most 45° C.

9. The method according to claim 1, wherein the third temperature is at most 35° C.

10. The method according to claim 1, wherein the first process gas stream and/or the second process gas stream are constant in terms of volume.

11. The method according to claim 1, wherein the feedstock includes thermoplastics, rubber, caoutchouc, and/or elastomers.

12. The method according to claim 1, wherein the first temperature and/or the second temperature are at most 65° C.

13. The method according to claim 1, wherein the first temperature and/or the second temperature are at most 55° C.

14. The method according to claim 1, wherein the third temperature is at most 40° C.

15. A method for comminuting heat-sensitive feedstock to a particle size of less than 500 μm, the method comprising:
    precomminuting the feedstock to a size smaller than 4 mm in a rotating comminuting device through which a first process gas stream flows;
    regulating a first temperature of the feedstock in an outlet of the rotating comminuting device in a first control circuit by adding water to the feedstock before and/or during and/or after the precomminution;

after the precomminuting of the feedstock, fine grinding the feedstock to a size smaller than 500 µm in a rotating fine grinding device through which a second process gas stream flows; and regulating a second temperature of the feedstock in an outlet of the rotating fine grinding device in a second control circuit by adding water to the feedstock before and/or during and/or after the fine grinding, wherein the feedstock is removed by suction from the outlet of the fine grinding device, and wherein a temperature of the feedstock in the suction area is regulated in another control circuit by adding water in the suction area and/or in the outlet of the rotating fine grinding device.

16. The method according to claim 15, wherein the temperature of the feedstock in the suction area is at most 45° C.

17. The method according to claim 15, wherein the temperature of the feedstock in the suction area is at most 40° C.

18. The method according to claim 15, wherein the temperature of the feedstock in the suction area is at most 35° C.

\* \* \* \* \*